(12) United States Patent
Liu et al.

(10) Patent No.: US 12,200,138 B2
(45) Date of Patent: Jan. 14, 2025

(54) SYSTEM AND METHOD OF ESTABLISHING A TRUSTED RELATIONSHIP IN A DISTRIBUTED SYSTEM

(71) Applicant: HUAWEI TECHNOLOGIES CO., LTD., Shenzhen (CN)

(72) Inventors: Lifeng Liu, Plano, TX (US); Jian Li, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 17/832,410

(22) Filed: Jun. 3, 2022

(65) Prior Publication Data

US 2022/0294637 A1    Sep. 15, 2022

Related U.S. Application Data

(63) Continuation of application No. PCT/US2019/064699, filed on Dec. 5, 2019.

(51) Int. Cl.
*H04L 9/32*      (2006.01)
*G06F 21/64*     (2013.01)
*H04L 9/40*      (2022.01)

(52) U.S. Cl.
CPC ............ *H04L 9/3236* (2013.01); *G06F 21/64* (2013.01); *H04L 63/123* (2013.01)

(58) Field of Classification Search
CPC ...... H04L 9/3236; H04L 63/123; G06F 21/64
See application file for complete search history.

(56) References Cited

U.S. PATENT DOCUMENTS

| | | | | |
|---|---|---|---|---|
| 2015/0006895 A1* | 1/2015 | Irvine | ................. | G06F 21/6209 |
| | | | | 713/171 |
| 2016/0134593 A1* | 5/2016 | Gvili | ..................... | H04L 63/061 |
| | | | | 713/170 |
| 2018/0026791 A1 | 1/2018 | Bohli et al. | | |
| 2018/0091596 A1* | 3/2018 | Alvarez | .............. | H04L 63/0428 |
| 2019/0349190 A1* | 11/2019 | Smith | ................... | H04L 63/123 |
| 2019/0354977 A1* | 11/2019 | Tang | .................... | G06Q 20/401 |
| 2020/0313903 A1* | 10/2020 | Yu | .......................... | H04L 9/3073 |

(Continued)

FOREIGN PATENT DOCUMENTS

CN    108711052 A    10/2018
EP      3547199 A1     4/2018

(Continued)

*Primary Examiner* — Darshan I Dhruv
(74) *Attorney, Agent, or Firm* — Conley Rose, P.C.

(57) ABSTRACT

A node in a distributed network computes a hash of content for a service received in a data packet. The node verifies the data packet by comparing the hash of the content of a service received from a neighboring node to a hash of the content computed by the node. An amount of content of the service having a same identification is accumulated in a trusted execution environment (TEE) of the node, and a signature based on code stored in a TEE of the node is generated. The node then sends the data packet to the next neighboring node, where the service-related information includes the service ID, a hash of the service content and the signature. The service records with the accumulated amount of service content, accumulated hash values, and nodes' signatures are sent to the validation nodes to reach consensus for the service provided.

20 Claims, 11 Drawing Sheets

(56) References Cited

U.S. PATENT DOCUMENTS

2020/0322224 A1\* 10/2020 Sheth ................. H04W 40/246
2020/0322353 A1\* 10/2020 Bhandari ............ H04L 63/1425
2020/0366659 A1\* 11/2020 Yu ........................ H04L 9/0643
2020/0412542 A1\* 12/2020 Bartolucci ............ H04L 9/3066

FOREIGN PATENT DOCUMENTS

| WO | WO-2010086802 A1 \* | 8/2010 | ........... H04L 9/3073 |
| WO | WO-2015112030 A1 \* | 7/2015 | ............. G06F 21/44 |
| WO | WO-2016131473 A1 \* | 8/2016 | ........... G06F 16/137 |
| WO | WO-2017148527 A1 \* | 9/2017 | ......... G06Q 10/0833 |

\* cited by examiner

```
accumulator  //For its neighbor node sending packets to this node, one per path per service
{
    accumulated service amount;
    (accumulated hash, packetsIDs);     // IDs may be represented as union of ranges: (startID, endID, interval)
    // hash values of sub-trees if there are empty nodes in the ID range of received packets
    (hashValue1, packetIDs_1);
    (hashValue2, packetIDs_2);
    ......
} expectedAccumulatedHashValues  //For its neighbor node receiving packets from this node, one per path per service
{
    (expectedAccumulatedHashValue_i, packetID_i, packet, packetHash);
    (expectedAccumulatedHashValue_i+1, packetID_i+1, packet, packetHash);
    (expectedAccumulatedHashValue_i+2, packetID_i+2, packet, packetHash);
    ......
    //Verified packets information (based on acknowledgements) can be cleaned timely such that the required buffer size is
    limited
} messageToNextNode {
    serviceID;
    packet;     // data content
    ......
    hash;       // packet hash
    signature;  // signed using the private key inside TEE of this node
}
```

Service Node 120

FIG. 4B

SYSTEM AND METHOD OF ESTABLISHING A TRUSTED RELATIONSHIP IN A DISTRIBUTED SYSTEM

CROSS-REFERENCE TO RELATED APPLICATIONS

This application is a continuation of International Application No. PCT/US2019/064699 filed on Dec. 5, 2019 by Futurewei Technologies, Inc., and titled "System and Method of Establishing a Trusted Relationship in a Distributed System," which is hereby incorporated by reference in its entirety.

TECHNICAL FIELD

The disclosure generally relates to establishing trusted relationships in a distributed system.

BACKGROUND

Trusted computing platforms may rely on hardware isolation to create a trusted execution environment (TEE) in which to perform security sensitive operations such as backing up sensitive data with a cloud backup service. sharing sensitive information such as photos, meeting minutes, documents, etc., with individuals via a social networking site, etc. Such platforms may integrate a security co-processor (e.g., manageability engine, converged security engine (CSE), etc.) for secure processing needs. TEE environments may be used to perform cryptographic operations, e.g., using trusted platform module (TPM) technology, platform trust technology (PTT), identity protection technology (IPT), and the like.

SUMMARY

According to one aspect of the present disclosure, there is a computer-implemented method for establishing a trusted relationship in a distributed system, comprising computing, by a node, a hash of content for a service received in a data packet from a neighboring node, the data packet including the service and service-related information; verifying, by the node, the data packet by comparing the hash of the content of the service received from the neighboring node to a hash of the content computed by the node; accumulating, by the node, an amount of content of the service received in the data packet from the neighboring node having a same service ID; generating, by the node, a first signature based on code stored in a trusted execution environment (TEE): and sending, by the node, the data packet with the service and the service-related information to the next neighboring node, the service-related information including the service ID, a hash of the accumulated amount of content and the first signature.

Optionally, in any of the preceding aspects, the computer-implemented method further comprising sending an acknowledgement to the neighboring node which includes the service ID, the hash attic accumulated content of the service and another signature.

Optionally, in any of the preceding, aspects, the computer-implemented method further comprising creating a hash tree, the bash tree includes a node structure including one or more leaf nodes, one or more child nodes and one or more parent nodes, wherein each leaf node represents a hash of the content in the data packet received from the neighboring node and each parent node represents an accumulated hash of the content of each direct leaf node or each child node.

Optionally, in any of the preceding aspects, wherein the accumulation of the hash is calculated by using the hash tree based on the service ID; adding the hash of the content of the service in the data packet received as a leaf node in the hash tree; removing the one or more, child nodes of each parent node when the its children nodes are complete.

Optionally, in any of the preceding aspects, wherein the hash tree is divided into hash subtrees, where each hash subtree represents a parent node and its corresponding one or more leaf nodes or one or more child nodes, and the data packet corresponding to each hash subtree is received from the neighboring nodes along a plurality of different paths.

Optionally, in any of the preceding aspects, the computer-implemented method further comprising merging, at the node, each of the hash subtrees corresponding to the received data packets along the plurality of different paths.

Optionally, in any of the preceding aspects, the computer-implemented method further comprising determining whether the hash of the data packets is missing from the accumulated hash by storing the accumulated hash for each transmission path with the same service ID after sending the data packet from the neighboring node; extracting the accumulated hash from the acknowledgement of the neighboring node; and comparing the extracted accumulated hash with the stored accumulated hash.

Optionally, in any of the preceding aspects, the computer-implemented method further comprising after completion of receipt of the data packets having the same service ID, sending the data packet including the accumulated amount of content of the service, the accumulated hash of the data packets and the node signature, to a validation node, wherein the validation node, verifying, using a public key of a key pair for each record received from a neighboring node, the amount of the content of the service and the hash of the content are valid, and forming a consensus, based on the verified records received from different neighboring nodes with the same service ID, about the accumulated amount of the content for the service received in the data packets for nodes in the distributed system.

Optionally, in any of the preceding aspects, wherein the service-related information received by the neighboring node includes the service ID, the hash of the content of the service and a second signature created by a private key of a key pair.

Optionally, in any of the preceding aspects, the computer-implemented method further comprising verifying the signature, signed by the neighboring node, in the data packet using a public key of a key pair.

According to one other aspect of the present disclosure, there is provided a node for establishing a trusted relationship in a distributed system, comprising a non-transitory memory storage comprising instructions; and one or more processors in communication with the memory, wherein the one or more processors execute the instructions to: compute a hash of content for a service received in a data packet from a neighboring node, the data packet including the service and service-related information; verify the data packet by comparing the hash of the content of the service received from the neighboring node to a hash of the content computed by the node; accumulate, by the node, an amount of content of the service received in the data packet from the neighboring node having a same service ID; generate, by the node, a first signature based on code stored in a trusted execution environment (TEE); and send the data packet with the service and the service-related information to the next neighboring node, the service-related information including the service ID, a hash of content and the first signature.

According to still one other aspect of the present disclosure, there is a non-transitory computer-readable medium storing computer instructions for establishing a trusted relationship in a distributed system, that when executed by one or more processors, cause the one or more processors to perform the steps of receiving, at a node, a data packet from a neighboring node, the data packet including a service and service-related information; computing, by the node, a hash of content for the service received in the data packet from the neighboring node; verifying the data packet by comparing the hash of the content of the service received from the neighboring node to a hash of the content computed by the node; accumulating, by the node, an amount of content of the service received in the data packet from the neighboring node having a same service ID; generating, by the node, a first signature based on code stored in a trusted execution environment (TEE); and sending the data packet with the service and the service-related information to the next neighboring node, the service-related information including the service ID, a hash of content and the first signature.

This Summary is provided to introduce a selection of concepts in a simplified farm that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIG. 4B illustrates a data structure of a service node in accordance with FIG. 4A.

DETAILED DESCRIPTION

Figure 1:
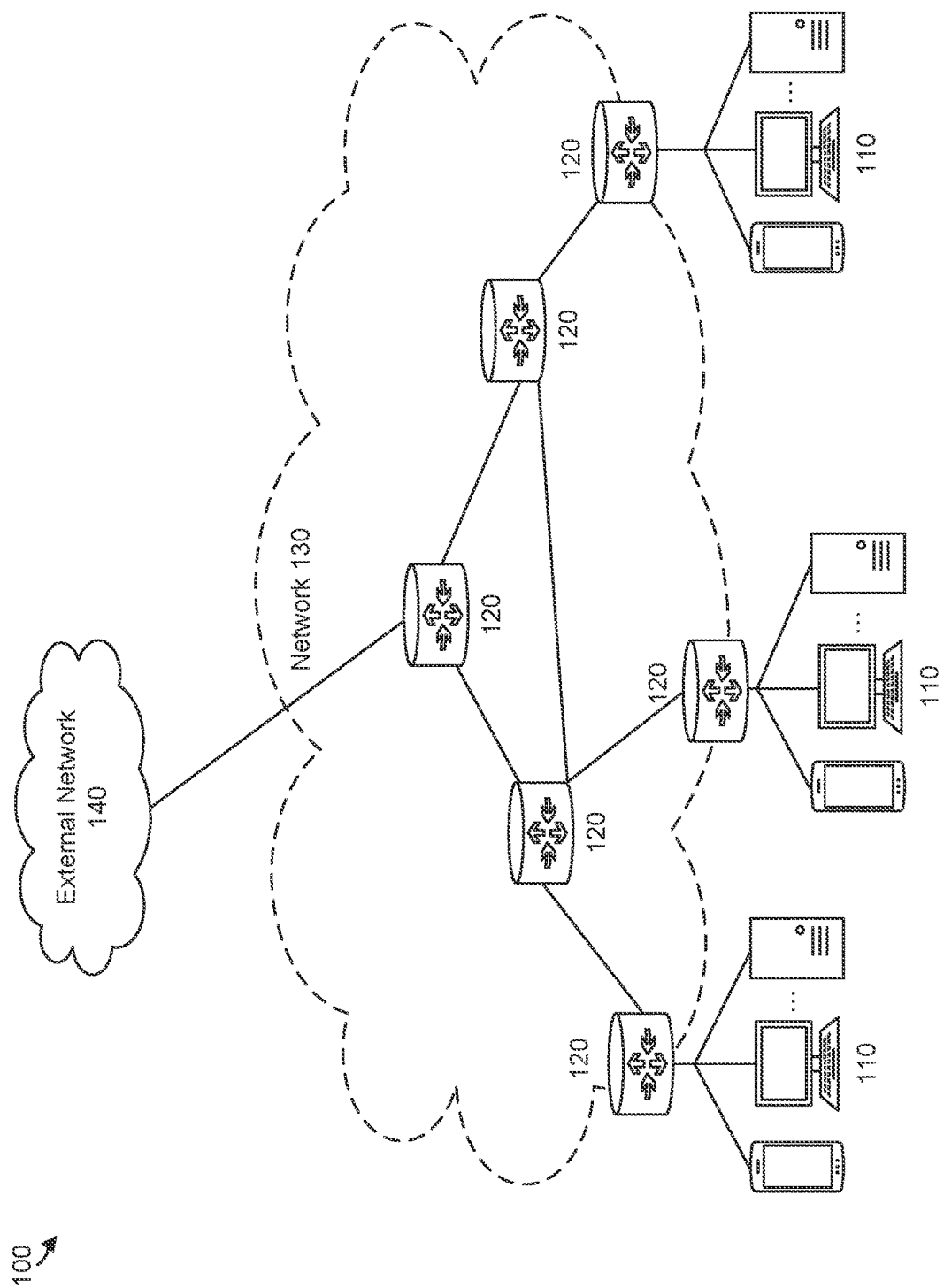
FIG. 1 illustrates an example system in which embodiments of the disclosure may be implemented.

The present disclosure will now be described with reference to the figures, which in general relate to technology for establishing a trusted relationship in a distributed system.

Consensus-based distributed and decentralized service systems are challenging traditional centralized system services. How to identify and generate consensus for transactions and services between customers and providers in a decentralized environment is a key. However, existing consensus methods have many limitations, such as Proof of Work in BitCoin, which consumes a large amount of computing resources and often limits transaction frequency. Solutions such as Intel's™ hardware-based consensus, proof of elapsed. time, is more efficient and scalable, and Microsoft's™ COCO framework is based on TEEs that leverage Intel hardware to accelerate consensus. Nevertheless, it remains challenging to create an efficient and well-scalable consensus system for massive service transactions between a large number of nodes. For example, in a self-organizing dynamic network for sharing internet connections, it remains challenging for an intermediate node to effectively count the service workload and the cost in a trusted way.

The disclosed technology identifies and generates a consensus for transactions and services between customers and service providers in a decentralized environment. For example, for a customer transaction requesting a specific service from a service provider, service nodes in the distributed network generate service records inside respective TEEs based on service amount accumulation and service content hashing for neighboring nodes. The service records generated inside the TEE are sent to validation nodes (and neighbor nodes) for validation and reaching consensus about the provided service. The validation nodes validate the service records received from each of the service nodes for the same service, and reach consensus about the service amount. In one embodiment, the results are then sent to a payment system, which stores the results in a ledger (e.g., a blockchain based ledger for transaction recording and executes the corresponding transaction).

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates an example system in which embodiments of the disclosure may be implemented. System 100 includes computing devices 110, as well as network nodes 120, connected via network 130. In one embodiment, the system 100 is a distributed system in which the computing devices 110 and/or network nodes 120 include a trusted execution environment (TEE), as will be explained below. Although particular components of the system 100 are shown in FIG. 1, the system 100 is not limited to such components and may also include additional and/or different components. For example, in certain examples, the system 100 can include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

Networks 130 may be wired or wireless and include public networks or private networks including, but not limited to local area networks (LAN), wide area networks (WAN), satellite networks, cable networks, WiMaX networks, and communication networks, such as LTE and 5G networks. As shown in FIG. 1, network 130 can include one or more network nodes 120 that interconnect multiple computing devices 110, and connect computing devices 110 to external network 140, e.g., the Internet or an intranet. For example, network nodes 120 may include any number of different devices that facilitate network communications, such as servers, switches, routers, hubs, gateways, access points, firewalls, base stations, repeaters, backbone devices, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 110. In the illustrated example, each of the host sets 110 is operatively coupled to a corresponding network node, which are commonly referred to as "top-of-rack" or "TOR" network nodes. TOR network nodes 120c can then be operatively coupled to additional network nodes 120 to form a computer network in a hierarchical, flat, mesh, or other suitable types of topologies that allow communications between computing devices 110 and external network 140. In other examples, multiple host sets 110 may share a single network node 120.

Computing devices 110 may be virtually any type of general- or specific-purpose computing device. For example, these computing devices may be user devices such as desktop computers, laptop computers, tablet computers, display devices, cameras, printers, Internet of Things (IoT) device, wearable computing devices, mobile devices or smartphones. However, in a data center environment, these computing devices may he server devices such as application server computers, virtual computing host computers, or file server computers. Moreover, computing devices 110 may be individually configured to provide computing, storage, and/or other suitable computing services.

Figure 2:
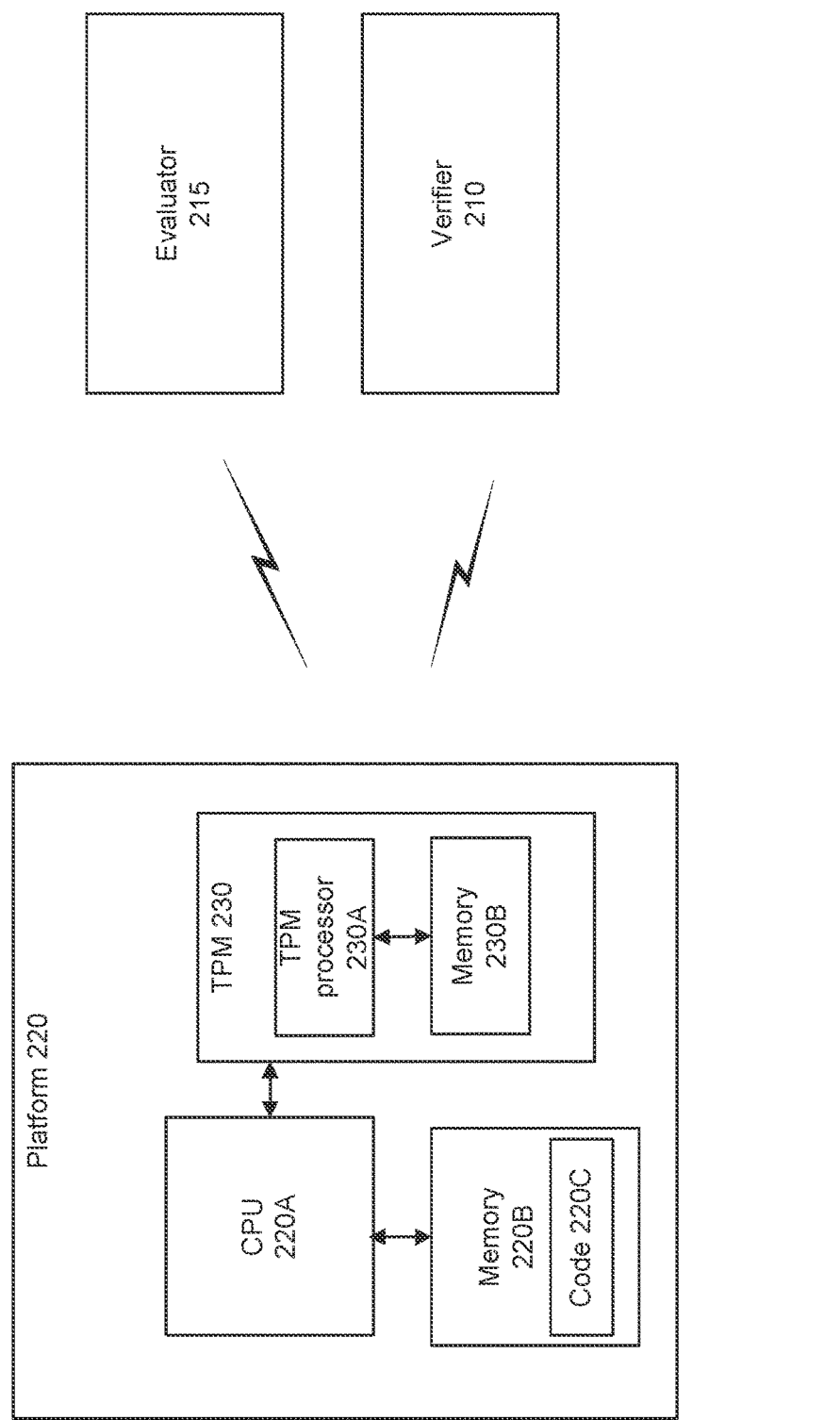
FIG. 2 illustrates an example of provisioning nodes to form a trusted environment in the distributed network of FIG. 1.

FIG. 2 illustrates an example of provisioning nodes to form a trusted environment in the distributed network of FIG. 1. The provisioning system 200 initializes (or provisions) a secure area of a processor or processing device such that trusted applications may be executed with integrity. Although provisioning is not limited to the disclosed embodiment, the provisioning system 200 as illustrated includes a verifier device 210 and evaluator 215 that can communicate with a platform 220 via, for example, a wired or wireless network. In one embodiment, the platform 220 may be a collection of one or more hardware components. For example, the platform 220 can be at least one of a chipset, an integrated circuit, a processor, a microprocessor, a digital signal processor, or another type of embedded system. In one embodiment, the platform 220 is (or is part of) a network node 120 and/or computing device 110. The integrity of the platform 220 can he verified either during system boot or at device runtime.

As illustrated in the example embodiment, the platform 220 includes a central processing unit (CPU) 220A, a memory 2208 and a trusted platform module (TPM) 230. In one embodiment, the CPU 220A of the platform 220 can be an all-purpose processing unit. The memory 220B may also store code 220C, which comprises an authorized code from a trusted third party. Among other functions, the code 220C operates to generate a key pair (private key and public key) during initialization of the platform 220.

The TPM 230 includes an internal and secure processor 230A and memory 230B. In one embodiment, the memory 230B of the TPM 230 includes a unique signature key SK. The processor 230A of the TPM 230 is typically a purpose hardware unit allowing it to perform cryptographic operations such as key generation, encryption and decryption.

Each of these components comprises control logic for implementing steps of an attestation (or signature) process. In general, the control logic may be implemented in hardware or software or a combination thereof. For purposes of discussion, in the following example it will be assumed that each of the system components is implemented by a general-purpose computer. In particular, platform 220 is implemented by a user PC (such as computing device 110) and includes a security module in the form of TPM 230. The structure and operation of the TPM is defined in detail in Trusted Computing Group, TPM Specification v.12 and later. Generally, the TPM is a hardware component in the form of a dedicated integrated circuit built into a variety of platforms. The TPM is equipped with an anti-tamper capability, providing secure storage for digital keys, certificates and passwords, as well as functionality for various security-related operations such as key generation, platform attestation, privacy protection functions and implementation of cryptographic algorithms and protocols. The platform attestation functionality provided by TPMs is based on secure storage and reporting of platform configuration values. These values are derived from measurements of hardware and software configurations and are securely stored within the TPM in a set of Platform Configuration Registers (PCRs).

More specifically, the attestation process includes PCR values being sent to the verifier 210 under a digital signature which can be authenticated by the verifier 210. According to the TPM specification. Attestation identity Keys (AIKs) can be used for this purpose. An AIK is an RSA (Rivest, Shamir, Adleman) key pair and is specifically used as a signature key for signing PCR data. That is, the private key of the AIK pair is used to sign data sent to the verifier who then authenticates the signature by verifying the data using the public AIK key. The validity of the public AIK key can be ensured by some form of credential trusted by the verifier. For example, the platform may obtain a certificate on the AIK from a Trusted Third Party (TTP) such as a Certification Authority (CA). This certificate can then. he sent to the verifier with the public AIK key. Other procedures may be used.

As noted above, the signature key SK is defined in the TPM 230 of platform 220. This signature key SK is bound to both the TPM 230 and a defined configuration of the platform 220. The effect of this binding is that the private key of the signature key SK is kept securely in the TPM 230, such that the signature key SK can only be used with that particular TPM (i.e., SK is non-migratable) and only if the platform 220 has a defined configuration corresponding to a defined state of the PCRs. This defined state of PCRs may be, for example, that the PCRs contain a specified set of Ione or more) PCR values, or that a set of stored PCR values satisfies a defined condition. e.g., that application of a predetermined hash function results in a specified hash value.

During implementation of the attestation process, the platform 220 obtains a credential for the signature key SR from the evaluator 215. The purpose of this credential is to certify that the platform configuration to which the signature key SK is bound is a trusted platform configuration. In a first step, the signature key SK (specifically the public key) is sent to evaluator 215 with data indicating the specific PCR state to which the key SK is bound. The evaluator 215 then verifies that the PCR state corresponds to a trusted platform configuration. Assuming the PCR state is deemed trustworthy, the evaluator 215 sends a credential for the signature key back to platform 220. Subsequently, when verifier 210 sends a challenge (e.g., a message or nonce) to platform 220, the platform 220 can use the credential to attest the validity of its configuration. Specifically, the platform demonstrates its ability to sign the challenge using the signature key SK and demonstrates possession of the credential to verifier 210. The verifier 210 can authenticate the credential and, trusting evaluator 215, knows that the credential was issued for a key SK corresponding to a trusted PCR state. Moreover, because the key SK is hound to the PCR state verified by evaluator 2, the ability to use SK to sign the challenge is confirmation that the configuration of platform 220 is trustworthy. In this way, the user platform configuration is attested to the satisfaction of the verifier 210.

Figure 3:
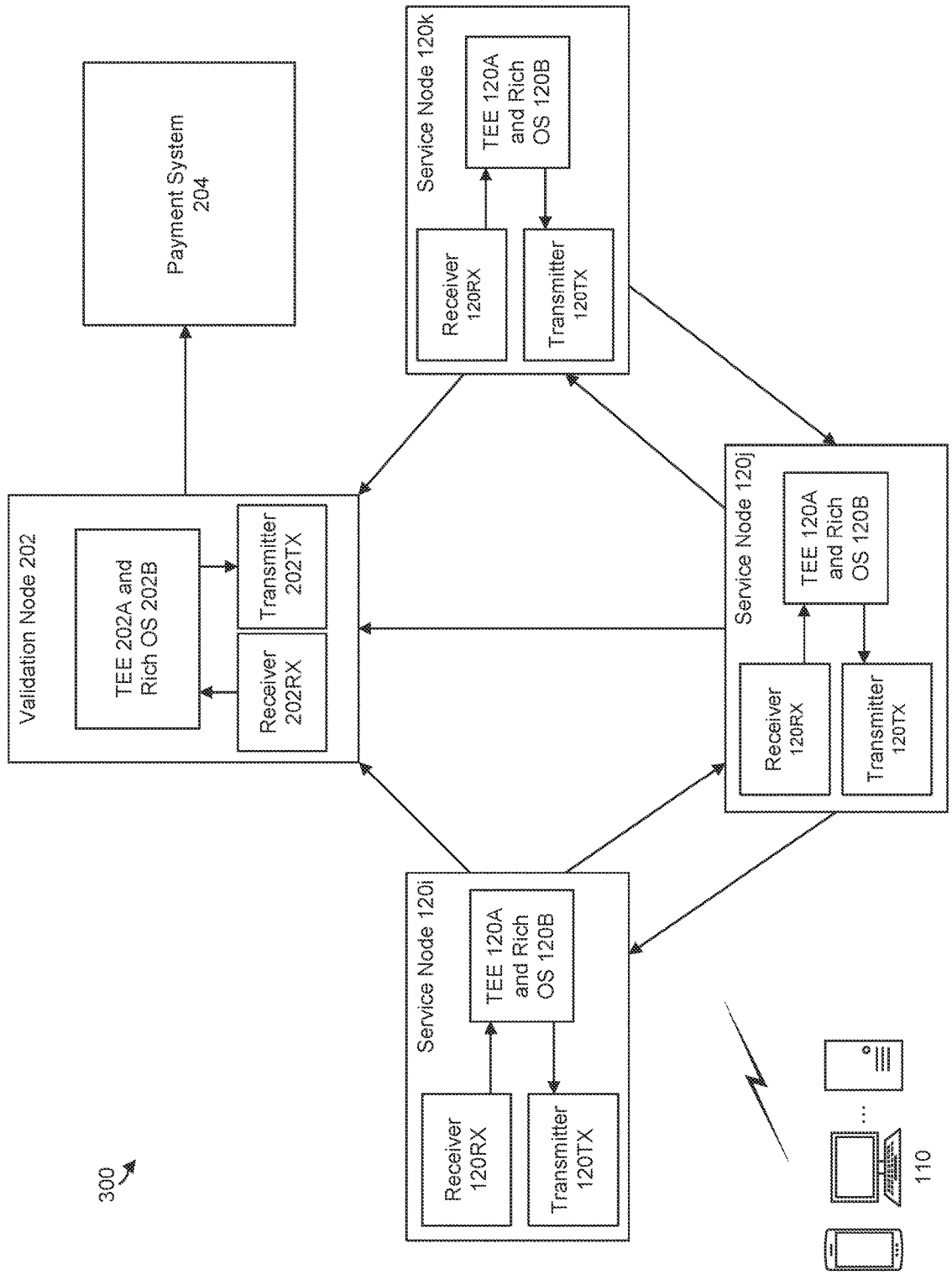
FIG. 3 illustrates an example distributed system including trusted execution environments in the system nodes.

FIG. 3 illustrates an example distributed system including trusted execution environments in the system nodes. The distributed system 300 includes computing devices 110, one or more service nodes 120i to 120k, one or more validation nodes 202 and a payment system 204. The components of the distributed system 300 may communicate, in one embodiment, via a network (such as the networks illustrated in FIGS. 1 and 6). In one embodiment, the distributed system 300 is designed to identify and generate a consensus for transactions and services between customers (e.g., computing devices) and service providers (e.g., service nodes) in a decentralized environment. For example, the service nodes 120i to 120k generate service records inside respective TEEs 120A, explained further below.

Service records, for one or more of the service nodes 120i to 120k, may be sent to the validation node 202 for validation and reaching the consensus about the service being provided by the service provider. Once received a validation node 202 validates the service record from each service node) for the same service and reaches the consensus. For example, the consensus may be a service amount that is sent to the payment system 204 (e.g., a blockchain based ledger for transaction recording). When the consensus is received at the payment system 204 from the validation node 202, it stores the result (e.g., in a ledger) and executes a corresponding transaction (e.g., the blockchain-based payment system). It is appreciated that any number of computing devices. service nodes and validation nodes may be included in the distributed system, and is not limited to the illustrated embodiment. Likewise, the nodes are not limited to a single TEE and may include one or more instances of the TEE. Moreover, while distributed system 300 is shown with securing a payment system, any numerous types of other systems be used with the system. For example, mobile identity, IoT, content protection, etc.

Each of the nodes (i.e., service nodes and validation node) include a hardware platform 220 (represented by TEEs 120A and 202A and rich operating system (rich OS) 120B and 202B), a receiver 102RX/202RX and a transmitter 120TX/202TX. In one embodiment, the rich OS 120B and 202B is part of a broader rich OS environment which is an execution environment for the overall hardware platform. An "execution environment" is a set of hardware components and software components (such as system software, embedded software, software applications, etc.) that supports one or more applications executed within the execution environment. Examples of a rich OS include a Linux operating system, a Windows® operating system, an Android operating system, etc. The rich OS environment further includes a TEE client application programming interface ("API"), and a TEE functional API. TEE client functional APIs are each an API that allows an application that is executed within the rich OS environment to interface with a TEE 120A or 202A. Rich OS environment further includes one or more client applications that is executed within the rich OS environment, and that interfaces with a TEE 120A or 202A using either the TEE client or functional API. Likewise, TEE 120A and 202A includes a TEE internal API that allows a trusted application that is executed within TEE 120A and 202A to interface with the rich OS environment.

As previously described, TEE 120A and 202A is a secure execution environment that is isolated from other execution environments, that provides security from software attacks that originate outside the TEE 120A and 202A through hardware mechanisms that other execution environments cannot control, and that supports access to one or more secured hardware components by one or more trusted applications. More specifically, TEE 120 and 202A is an execution environment for which: (a) any software components, such as computer programs, modules, or applications, that are executed within TEE 120A and 202A are trusted in authenticity and integrity, (b) TEE 120A and 202A can resist software attacks, and thus, can protect one or more hardware components within TEE 120A and 202A; and (c) both hardware components and software components are protected from unauthorized tracing and control through debug and test features. TEE 120A and 202A also defines safeguards as to which hardware components and software components an application that is external to TEE 120A and 202A can access.

in one embodiment, the system includes one or more secured hardware components as a safeguard. Secured hardware components are hardware components of hardware platform that are secured so that only trusted applications, such as trusted applications can access them. Examples of secured hardware components include a secure element, a key, a secure storage. a trusted user interface (such as a keypad or screen), a crypto accelerator, a controller, etc. In another embodiment, a Java TEE environment is used in which to execute one or more trusted applications. The Java TEE environment is a runtime environment that can execute Java-specific applications. As part of the Java TEE environment, there is a Java TEE API that allows a trusted application, executed within Java TEE environment, that provides an interface with the rich OS environment Java trusted applications can be included in Java TEE environment, such as s payment user interface application that interfaces with payment system 204.

The service nodes, as will be explained in more detail below, are generally responsible for generating service records inside of the TEE. These service records include service and service-related information associated with a transaction that will be forwarded, for example using transmitter 120TX, to the validation node 202 (and neighboring service nodes) for validation and to reach a consensus about the services being provided.

Upon receipt of the service records, for example using receiver 202RX, the validation node 202 determines whether a transaction is valid by verifying whether the service-related information (i.e., accumulated service amount and hash information) in the service record are valid based on all the received service records with the same service ID and the public keys of respective service nodes. Validation may occur at a single validation node or multiple validation nodes. In one embodiment, one or more service nodes operate as the validation node. Once verified, the validator node submits the service records for consensus by one or more of the validator nodes 202. The validator nodes 202 then vote "for" or "against" (e.g., a threshold number of identical votes) the service nodes containing the transactions 104 being sent to the payment system 204.

Figure 4A:
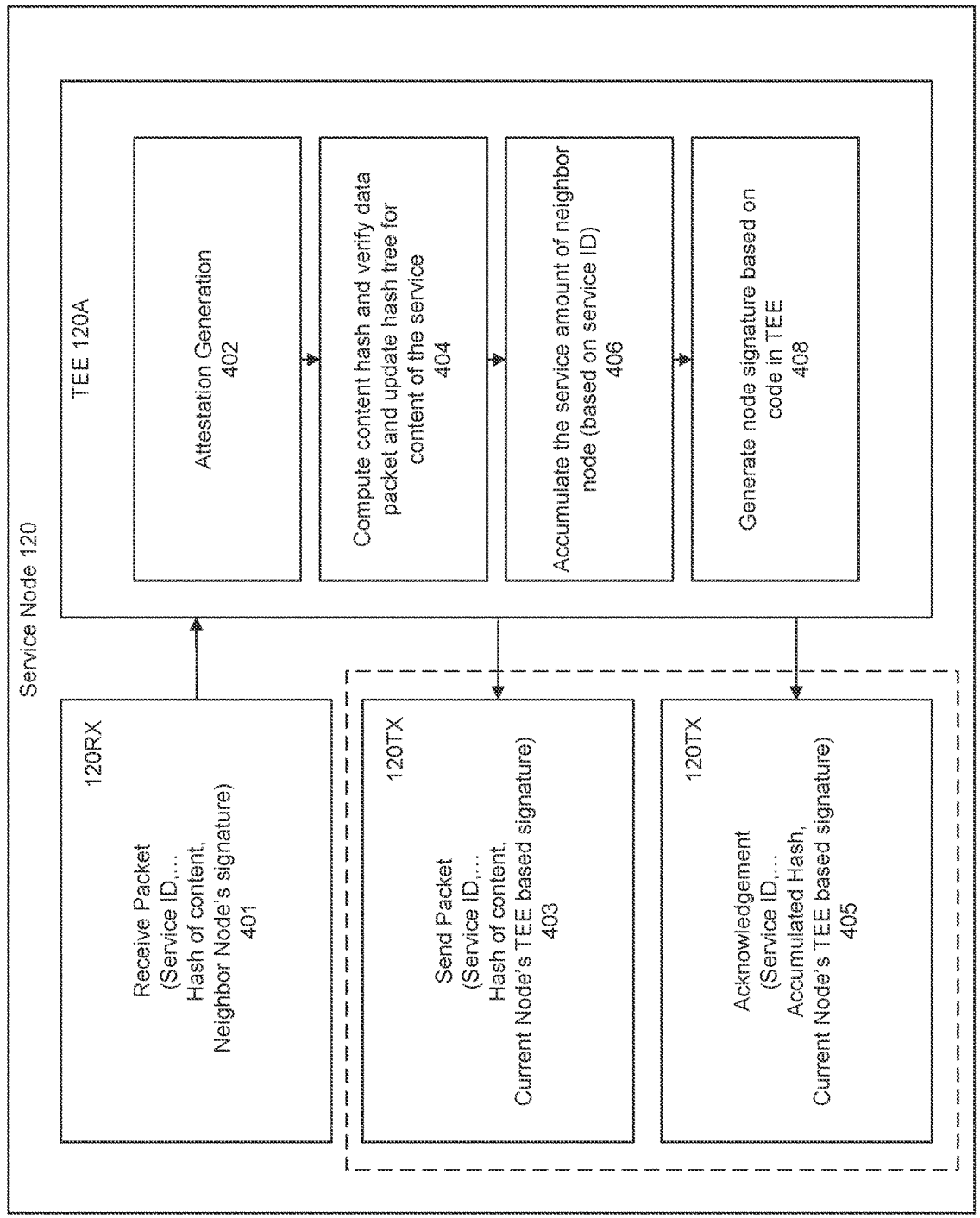
FIG. 4A illustrates an example process flow within a trusted execution environment (TEE).

FIG. 4A illustrates an example process flow within a trusted execution environment (TEE). In embodiments, the process flow may be computer-implemented methods performed, at least partly, by hardware and/or software components illustrated in the various figures and as described herein. In one embodiment, the disclosed process flow may be per by the TEE disclosed in FIGS. 3 and 4. In one embodiment, software components executed by one or more processors, such as processor(s) 230A or processor 704 perform at least a portion of the process.

At step 402, and prior to receipt of data packets at a service node 120, the TEE 120A is provisioned in accordance with the procedures detailed above, shown in FIG. 2. The provisioning generates the keys and signatures necessary to form the trusted environment.

Once provisioning has been completed, the data packets may he received at the receiver 120RX from a neighboring node (e.g., a one hop node or directly adjacent node from the current node) at step 401. In one embodiment, a neighboring node may be defined by a geographical region, a radius from a center node, a defined number of hops, etc. For example, in the case of a region, nodes within a defined boundary area are considered neighboring.

The data packets may also include a service (or file) and service (or file)-related information generated by the neighboring node. Services may include, for example, micro services (including micro payments), shared Internet connections, shared computing resources, smart contracts, P2P services, etc. A file may include content, such as images from an image file, or any other content capable of being stored in a file. In one embodiment, the service-related information is generated securely inside of its respective TEE 120A. For example, the service-related information generated in the TEE 120A may include a service identifier (ID) of the neighboring node (i.e., the sending node), a hash of content of the service (or file) generated by the neighboring node and a signature of the neighboring node created by a private of a key pair for validation and auditing. As explained further below, the service-related information can be transmitted to neighboring nodes and validation nodes for use in verification.

In one further embodiment, the data packets received are for a same service (or file).

After receipt of the data packet by the service node 120, the TEE 120A computes a hash of the content of the service (or file), verifies the data packet and updates a hash tree for content of the service (or file); accumulates an amount of content for the service (or file) of the neighboring node; and generates a node signature based on the code 220C in the TEE 120A. In one embodiment, the code 220C has a data structure 400 according to FIG. 4B, discussed below.

At step 404, the data packet is verified by the TEE 120A by computing a hash of the content for the service (or file) received in the data packet at the cu rent service node 120 (the service node receiving the data packet from the neighboring node). As explained above, any well-known hashing technique may he employed. The hash of the content for the service (or file) computed by the current service node 120 is compared to the hash of the content of the service calculated by and received from the neighboring node (not shown). If the computations match, then the data packet is verified and the hash tree for the content of service is updated. If the computations do not match, the data packet is not verified, and the procedures for identifying a missing or empty packet are implemented, discussed below with reference to FIG. 5B.

If the data packet received from the neighboring node is verified, the service node 120 uses the code 220C in the TEE 120A to accumulate the amount of content for the service (or file) provided by its neighboring node, at step 406. In particular, each service node 120 (i.e., any of service nodes 120$i$ to 120$k$) has a data structure that includes an accumulator (also referred to as an object logger or cryptographic accumulator) in which to accumulate a service (or file) of a neighboring node. For example, a static cryptographic accumulator scheme may be employed to allow accumulation of a finite set of values (e.g., information in the data packet) into a succinct value (i.e., the accumulator), or a dynamic accumulator (which is an extension of the static accumulator) may he used to dynamically add/delete values to/from an accumulator. However, it is appreciated that any number of different accumulators may be employed, and implementation is not limited to the disclosed embodiments. It is also appreciated that the code 220C in step 406 may be responsible for several other functions, including but not limited to, generation of the key pair, etc.

To record and verify the content of the service (or file), a hash tree is generated. Hash trees (or Merkle trees) are a type of data structure which contains a tree of summary information about a larger piece of data (e.g., a file) used to verify its contents. More specifically, a hash tree is a tree of hashes in which the leaves are hashes of data. blocks in, for instance, a file or set of files. Nodes further up in the tree are the hashes of their respective children. The node furthest up in the tree is referred to as the root node, which includes the overall hash value of all branches in the tree. In one embodiment, the hash tree includes a data structure with one or more leaves, one or more children and one or more parents. In one example, each of the leaves represents a hash of the content in the data packet received from the neighboring node and each parent represents an accumulated hash of the content of each direct leaf or each child. Examples of computing and updating a hash tree is explained in more detail below with reference to FIGS. 5A-5D.

At step 408, and after completion of receipt of the data packets having the same ID, a signature is generated using a corresponding private key of the key pair based on the code 220C stored in the TEE 120A. This signature is then used to encapsulate the data packet being sent to the next neighboring node and/or validation node, optionally another signature is generated to encapsulate an acknowledgment packet being sent to the prior neighboring node (i.e., the neighboring node from which the data packet at the current node has been received). The data packet sent to the next neighboring node, via transmitter 120TX, includes the updated service-related information. For example, the data packet includes the service ID, a hash of the of the content of the service calculated at the current node, and the current node's signature. The acknowledgement packet includes a hash of the accumulated amount of the content of the service calculated at the current node, and the current node's signature.

In one embodiment, by having each service node's 120 amount of content for the service (or file) accumulated by its neighbor node inside the TEE 120A with trusted code 220C, a chain-style verification process is formed that increases the system security and provides a robust mechanism in which to easily reach consensus. For example, service node 120$i$ amount of the content for a service is accumulated and calculated by its neighboring service node 120$j$, thereby forming a chained trusted service of records.

FIG. 4B illustrates a data structure of a service node in accordance with FIG. 4A. The data structure is represented by code 220C (also referred to as trusted code), which includes an "accumulator" to accumulate content of a service, an "expectedAccumulatedHashValue" to check for missing data packets and a "messageToNextNode" to send a data packet to a neighboring node. In one embodiment, the accumulator code hashes the accumulated amount of content for the service (or file) together with the data packet identifiers (IDs), where the IDs are represented as a union of ranges (startID, endID interval). For example, a hash of a first data packet may be accumulated with a hash of a second data packet for the same service (or file) ID, as explained further with reference to FIG. 5A. In one embodiment, hash values for a sub-tree that has empty nodes in the ID range (interval) are represented as (hashValue1, packetIDs_1) and (hashValue2, packetIDs_2). That is, the nodes in a hash tree that have an empty child node may include an intermediate node with the same value as the other, non-empty child node (i.e., the child node with a hash value for the packet), as explained with reference to FIG. 5A.

In one embodiment, if data packet loss occurs during transmission, the hash tree may include an empty or "missing" node. The expectedAccumulatedHashValue code checks the missing data packet from the accumulated hash of the content of the service (or file) received in the acknowledgement packet. In one embodiment, if the received hash value and the expected hash value are equal, there are no missing data packets. Otherwise, the accumulated hash values after the last pair of equal hash values may be compared and then missing, data packet ID can be found. More specifically, during transmission and receipt of data packets from a neighboring node having a same service (or file) ID, the accumulated hash of the content is stored. The accumulate hash being stored is then compared to an accumulated hash extracted from an acknowledgment of the neighboring node. The extracted accumulated hash and the stored accumulated hash are then compared. For example, the (expectedAccumulatedHashValue_i, packetID_i, packet, packetHash) may be compared to the hash values in the acknowledgement packets. A more detailed explanation is found below with reference to FIG. 5B.

In one further embodiment, the data packet is sent to a next neighboring node. The data packet contains the service and the service-related information, where the service-related information includes the service ID, a hash of the content and the first signature. For example, the messageToNextNode code includes the serviceID, packet (including the data content), a hash of the packet and the signature (singed using the private key inside of the TEE of the current node).

Figure 5A:
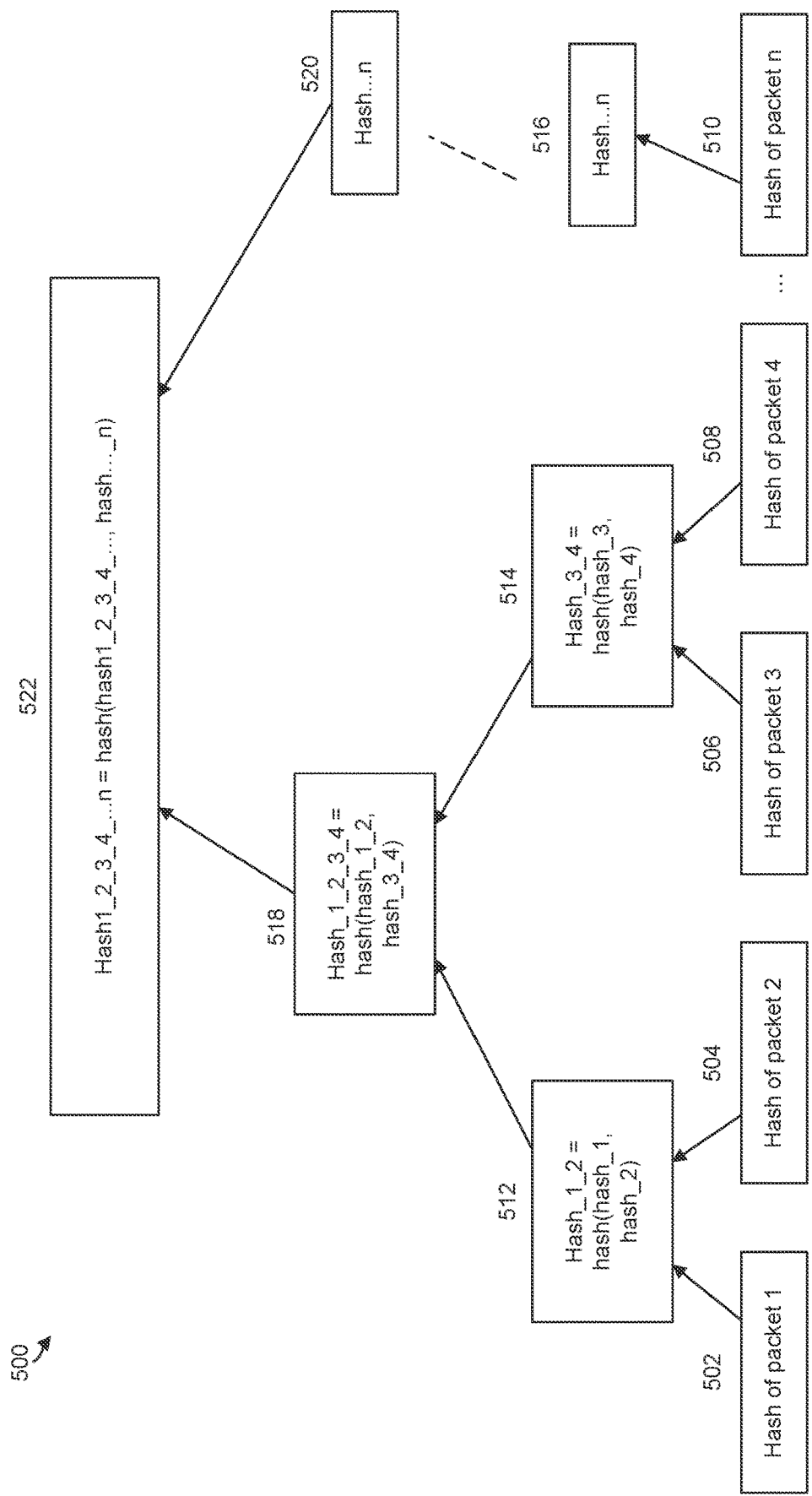
FIGS. 5A-5B illustrate example hash trees generated in accordance with the disclosed embodiments.
Figure 5B:
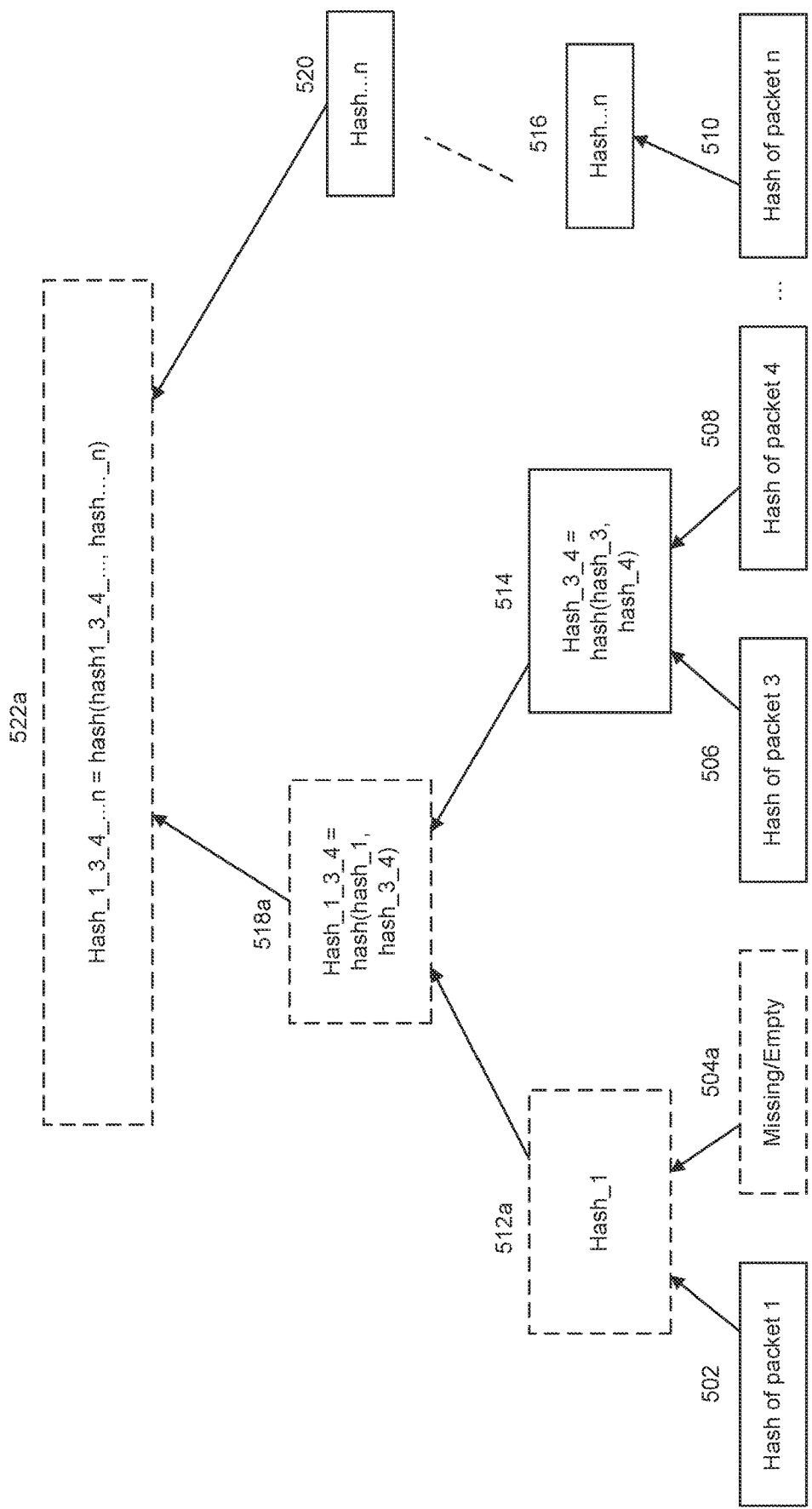

FIGS. 5A-5B illustrate example hash trees generated in accordance with the disclosed embodiments. In embodiments, the hash trees may be generated using computer-implemented methods, at least partly, by hardware and/or software components illustrated in the various figures and as described herein. In one embodiment, the disclosed hash trees may be performed by the service node 120, validation node 202 and/or computing device 110 disclosed in FIGS. 1 and 3. In one embodiment, software components executed by one or more processors, such as CPU 220 or processor 704, perform at least a portion of the process. For purposes of discussion, the service node 120 will be performing the procedures that follow.

Turning to FIG. 5A, disclosed is an example hash tree in which a service node 120 has received data packets from a neighboring node. The hash tree 500, or Merkle tree, is a tree data structure in which nodes are labeled with checksums, e.g., hash values, of the labels or values of their child nodes. The Merkle tree can be used for efficient and secure verification of the contents of large data structures, and may be generated by repeatedly hashing pairs of nodes until there is only one hash remaining (the Root Hash or the Merkle Root). This root hash summarizes all of the data in the hash tree nodes, and maintains the integrity of the data. If content in a node change (or the order changes), so does the root hash. In one embodiment, hashing pairs of nodes includes using a hash function. A hash function is a well-defined procedure or mathematical function that converts a large amount of data into a small datum (e.g., a single integer) that may be used as an index (e.g., in an array or other data structure). Examples of cryptographic hash functions include, but are not limited to, elf64, HAVAL, MD2, MD4, MD5, Radio Gatún, RIPEMD-64, RIPEMD-160, RTPEMD-320, SHA-1, SHA-256, SHA-384, SHA-512, Skein, Tiger and Whirlpool. While examples of cryptographic hashes are disclosed, it is appreciated that any suitable hash function may be used with embodiments of the disclosure.

As illustrated, every leaf node 502-510 in the Merkle tree represents a hash of content in a data packet (e.g., hash of data packets 1-n) for a same ID (e.g., service or file ID) received from a neighboring node. Each non-leaf node 512-522 (e.g., intermediate node or root hash) represents an accumulated hash of the content of each direct leaf or intermediate (child or parent) node. For example, leaf nodes 502-510 are the hash values of data packets 1-n, respectively, received from the neighboring node. Intermediate node 512 includes the hash of leaf nodes 502 and 504, where the hash is an accumulation of the hash of packet 1 and the hash of packet 2 (i.e., Hash_1_2=hash(hash_1, hash_2)). Intermediate node 514 is a hash of leaf nodes 506 and 508, where the hash is an accumulation of the hash of data packet 3 and the hash of data packet 4 (i.e., Hash_3_4=hash(hash_3, hash_4)). Further, intermediate node 516 has a single leaf node 510, which includes a hash of the content of packet n. As only a single leaf node exists, the intermediate node 516 includes leaf 510 and other children nodes. The hash function continues to intermediate nodes 518 and 520. Intermediate node 518 includes a hash of the content of intermediate nodes 512 and 514. For example, hashing intermediate nodes 512 and 514 results in a has value of Hash_1_2_3_4=hash(hash_1_2, hash_3_4), which is an accumulated hash of the hash of the content of the intermediate nodes. Intermediate node 520 includes the intermediate node 516 and other children nodes. The final hash of the intermediate nodes forms the root hash node 522. As explained, the root hash node summarizes all of the data in the hash tree nodes. In this example, the root hash node 522 is represented by a hash of intermediate nodes 518 and 520, which forms the root as Hash1_2_3_4_ . . . n=hash (hash_1_2_3_4 . . . n). In one embodiment, when each sub-tree is generated, only the root value needs to be maintained.

In FIG. 5B, an example hash tree with a missing or empty packet is illustrated. The hash tree in FIG. 5B corresponds to the hash tree 500 in FIG. 5A. In the example of FIG. 5B, a packet loss has occurred in one of the data packets (i.e., one of data packets 1 . . . n) being received at the current node 120. In this example, the information. associated with data packet 2 has a packet loss. Accordingly, the hash of data packet 2 in leaf node 504a is empty or missing content received from the neighboring node. As a result, the root hash of the hash tree (and each sub-tree) is missing the information lost in the hash of data packet 2, as explained below.

In order to identify missing content or an empty data packet, the service node 120 compares the expected hash values of the content for the service (or file) computed by the current service node 120 to the accumulated hash of the content of the service (or file) calculated by and received from the neighboring node (step 404, FIG. 4A) if the computations match, then the data packet is verified. If the computations do not match, there is a packet loss. Identifying missing content or an empty data packet (hereinafter, missing/empty data packet) may be performed by comparing the accumulator hash values after the last pair of equal hash values has been determined (i.e., after the computations match). As will become apparent from the discussion below, one advantage of this methodology is that the current service node 120 can add the accumulated hash of the content of the service (or file) to the acknowledgement message (step 405, FIG. 4A) to the previous neighboring node. This enables the previous neighboring node to check the hash values and determine the missing/empty data packet, and resend the data packet without having to resend from the source node 120.

To identify a missing/empty data packet, the "expectedAccumulatedHashValues" code of the data structure 400 is executed by the TEE 120A. Each accumulated hash of the content for the service (or file) with the same service (or file) ID is stored after sending a data packet. The following accumulated hashes are stored:

{(expectedAccumulatedHash_1, packetID_1), (expectedAccumulatedHash_2, packetID_2), (expectedAccumulatedHash_3, packetID_3), ... }.

If data packet 2 was not delivered successfully to the next neighbor (as shown in FIG. 5B), then the last matching hash value is "expectedAccumulatedHash_1", and the received accumulated hash from acknowledgement packet does not match "expectedAccumulatedHash_2", but matches hash (expectedAccumlatedHash_1, hash(packet 3)). Therefore, the missing data packet is identified.

When an acknowledge packet is received from a neighboring node (i.e., a downstream node), the accumulated hash is extracted from the packet as: "receivedAccumulatedHash_i." For example, the "receivedAccumulatedHash_i." for node 518a is "Hash_1_2_3_4." The receivedAccumulatedHash_i is then compared with the values within the "expectedAccumulatedHash" list (previously saved). If a match is found, then no packet loss exists (i.e., there is no missing/empty data packet) and the "expectedAccumulatedHash" values in the list prior to the match value may be removed, which results in the service node storing {(expectedAccumulatedHash_i, packetID_i), (expectedAccumulatedHash_i+1, packetID_i+1), ... }. If a match is not found, then a packet loss exists. In this case, for each data packet sent after the last match, it is assumed that the data packet (i.e., packetID_n) is missing (i.e., an empty value for the corresponding node in the hash tree). In this case, the corresponding "expectedAccumulatedHash" values are calculated for each of the other data packets sent, which results in:

{(new_expectedAccumulatedHash_n+1, packetID_n+1), (new_expectedAccumulateHash_n+2, packetID_n+2), ... }.

The new "expectedAccumulatedHash" values above are compared to "receivedAccumualtedHash_i." If a match is found, then the data packet with ID_n should be retransmitted. If no match is found, all data packets from last match may need to be retransmitted.

In one embodiment, since the parent (or root) node on a hash tree can remove its child nodes (after the child nodes have completed computing the hash value), storage space may be reduced. For example, after data packets 1 ... n are received, the parent (root) node 522 stores hash_1_2_3_4 ... n. However, the hash values stored in the child nodes (e.g., nodes 502, 504, 506, 508, 510, 512a, 514, 516, 518 and 520) may be removed since all the data packets at the leaf nodes are complete.

Figure 5C:
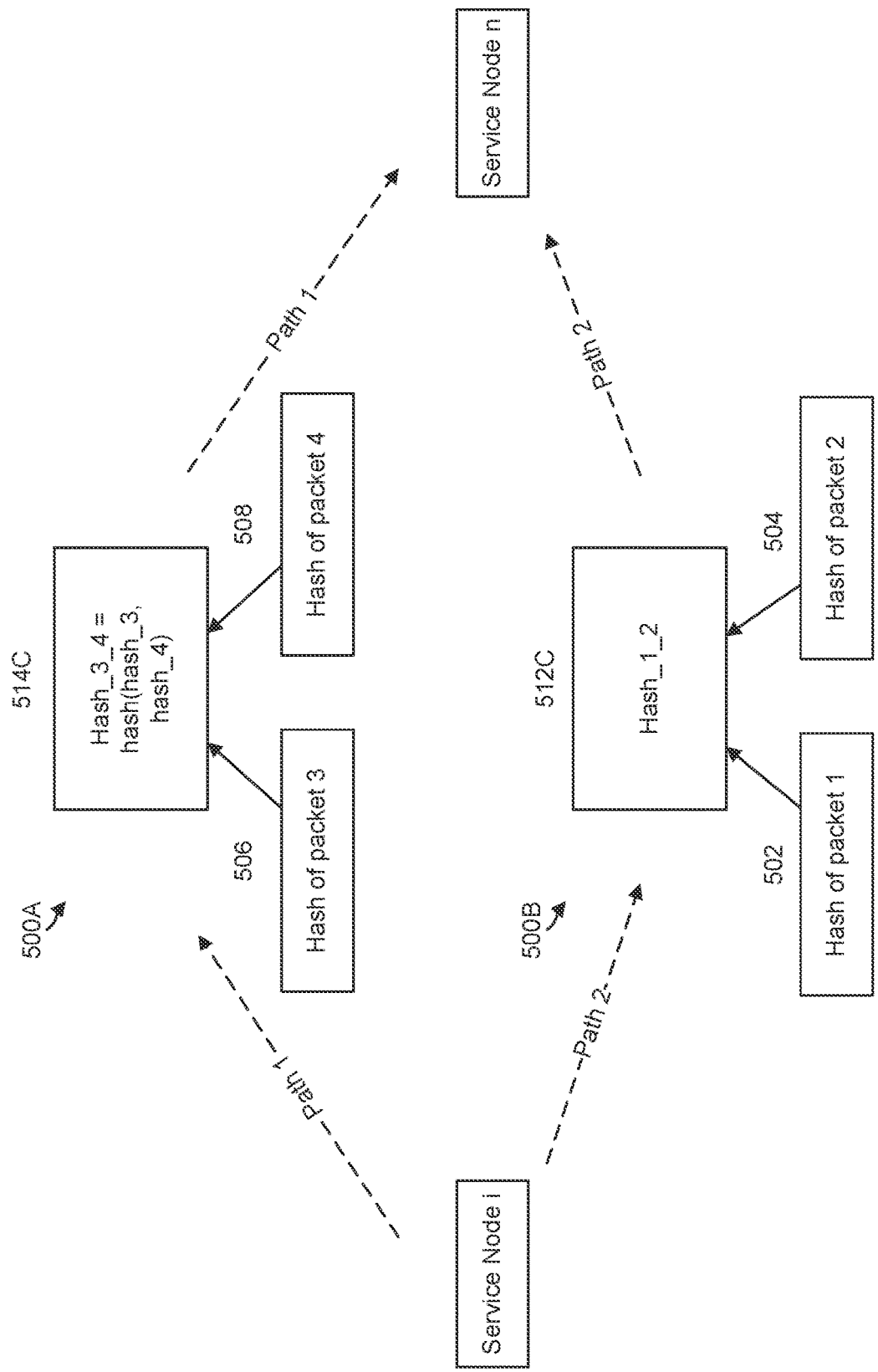
FIGS. 5C and 5D illustrate examples of a multiple path hash tree and validation of a multiple path hash tree.
Figure 5D:
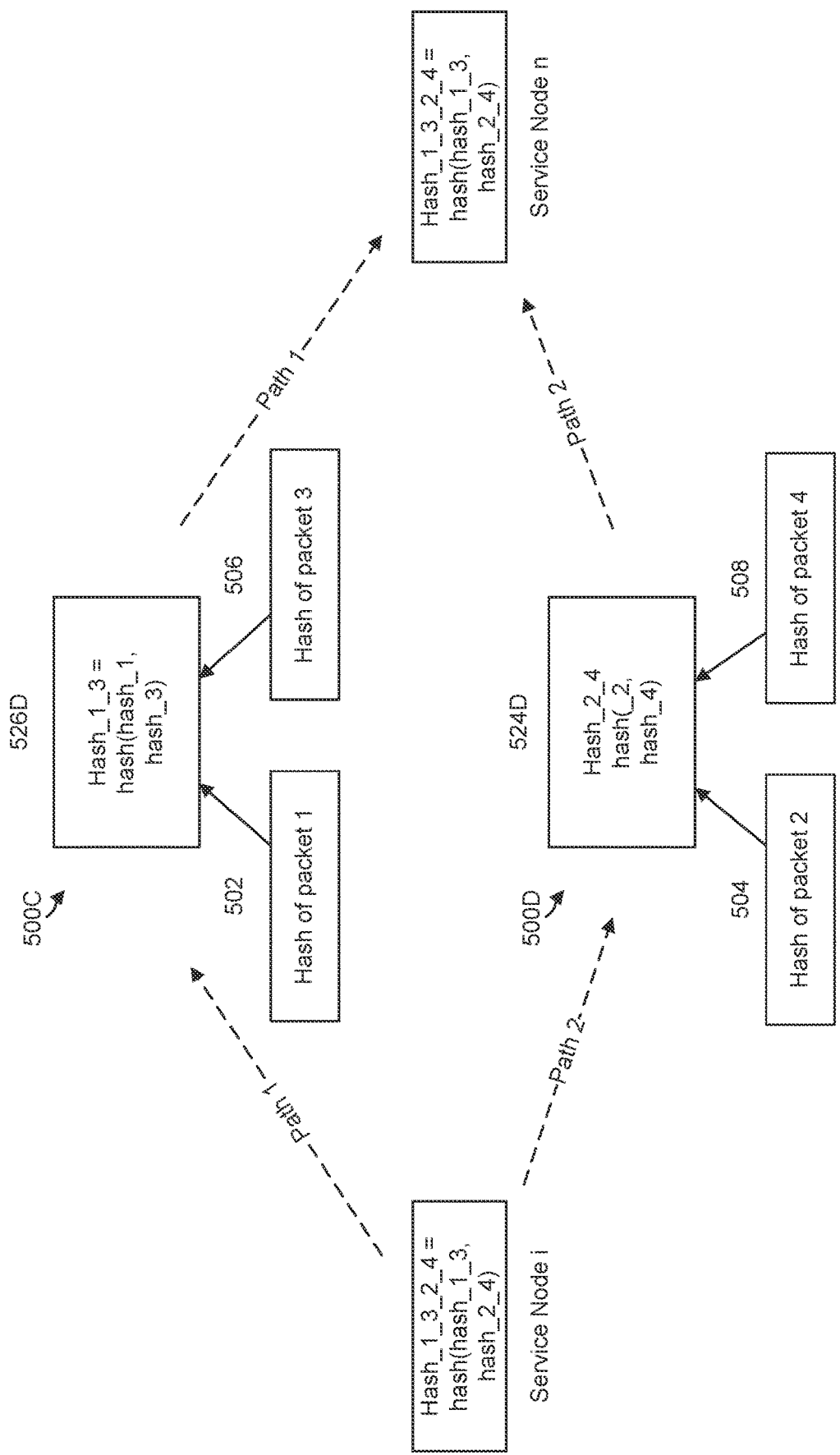

FIGS. 5C and 5D illustrate examples of a multiple path hash tree and validation of a multiple path hash tree. In embodiments, the hash trees may be generated using computer-implemented methods, at least partly, by hardware and/or software components illustrated in the various figures and as described herein. In one embodiment, the disclosed hash trees may be performed by the service node 120, validation node 202 and/or computing device 110 disclosed in FIGS. 1 and 3. In one embodiment, software components executed by one or more processors, such as CPU 220 or processor 704, perform at least a portion of the process. For purposes of discussion, the service node 120 will be performing the procedures that follow.

Turning to FIG. 5C, the diagram illustrates an example of a multi-path hash tree. The multi-path hash tree is an embodiment of the hash tree of FIG. 5A, in which data packets from a service node, such as node i, are sent along different paths via multiple neighboring nodes to another service node, such as service node n. That is, data packets from different sub-trees of the hash tree may be sent along different paths via different neighboring nodes. For example, a first sub-tree 500A of hash tree 500 (FIG. 5A) may include hash tree nodes 506, 508 and 514, and a second sub-tree 500B of hash tree 500 may include hash tree nodes 504, 504 and 512. In the example, the hash of content for data packets 3 and 4 (associated with the first sub-tree 500A) are sent via path 1 to neighboring node 514C, where the accumulated hash (hash_3_4=hash(hash_3,hash_4) is computed and stored. Similarly, the hash of content for data packets 1 and 2 (associated with the second sub-tree 500B) are sent via path 2 to neighboring node 512C, where the accumulated hash (hash_1_2=hash(hash_1,hash_2) is computed and stored. The hash_3_4 and the hash_1_2 are then sent via respective paths 2 and 1, and the hashes are merged at service node n.

In one embodiment, and referring to FIG. 5D, a service node (e.g., service node i) may send and receive data packets to and from multiple neighbor nodes (e.g., neighbor node 524D and 526D) and construct a hash sub-tree. For example, the hash tree 500 (FIG. 5A) of a service node i may be split into different sub-trees with multipath transmission, where data packets with odd packet ID numbers are sent along one path and data packets with even packet ID numbers are sent along another path. Thus, in one example, sub-trees are formed based on the odd/even ID numbers of the data packets. Stated differently there may be n sub-trees: (1, n+1, 2n+1 ... ), (2, n+2, 2n+2 ... ) ... (n, 2n, 3n). As illustrated in the example embodiment, the hash tree of service node i (represented as hash_1_3_2_4=hash(hash_1_3,hash_2_4)) is split into two sub-trees—a first sub-tree 500C that includes hash_1_3 and second sub-tree 500D that includes hash_2_4. Each of the sub-trees 500C and 500D may then he sent along respective paths, such as path 1 and path 2, stored at different neighbor nodes 524D and 526D, and sent to service node n where the two hash trees may be merged back together.

The merging of the hash sub-trees from the different paths may then be used to verify the transmission of the content. In the disclosed embodiment, service node n stores the two hash trees (e.g., hash_1_3 and hash_2_4) sent from service node i, one for each of the paths, such that the validation node (FIG. 3) may compare them to the hash values stored from node j and node k (also sent to the validation node, as described above). In one embodiment, the validation node may merge two hash trees and compare them with the hash values sent from service node i and service node n to validate the records and to reach a consensus, as described above.

Figure 6:
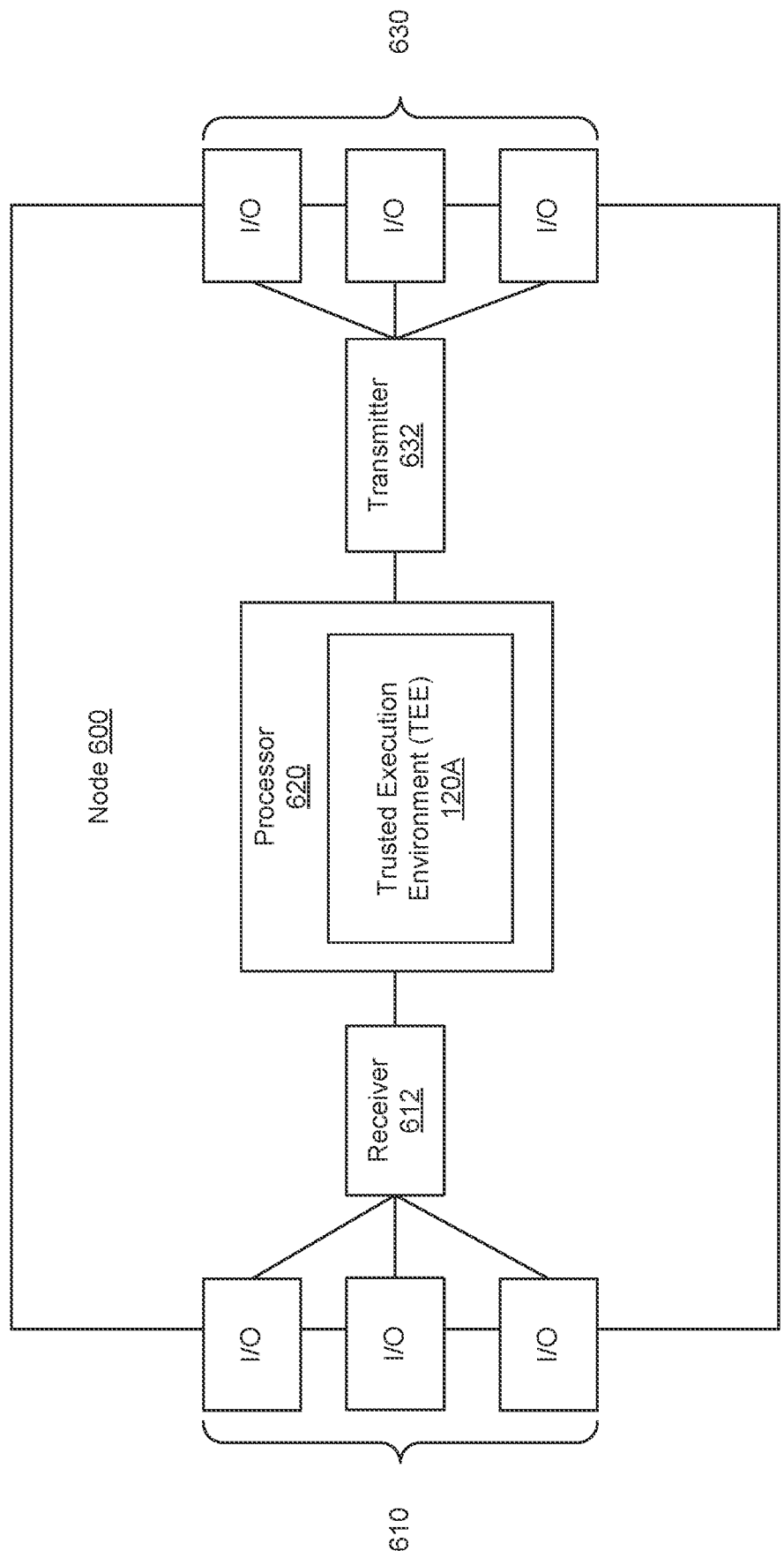
FIG. 6 illustrates an embodiment of a node in accordance with embodiments of the disclosure.

FIG. 6 illustrates an embodiment of a node in accordance with embodiments of the disclosure. The node (e.g., a server, router, etc.) 600 may be, for example, any of the computing devices 110 and 120 in the system of FIG. 1 or any other node as described above. The node 600 may comprise a plurality of input/output ports 610/630 and/or receivers (Rx) 612 and transmitters (Tx) 632 for receiving and transmitting data from other nodes, a processor 620, including a TEE 120A to process secure data.

Although illustrated as a single processor, the processor 620 is not so limited and may comprise multiple processors. The processor 620 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 620 may be configured to implement any of the schemes described herein using any one or combination of steps described in the embodiments. Moreover, the processor 620 may be implemented using hardware, software, or both.

Figure 7:
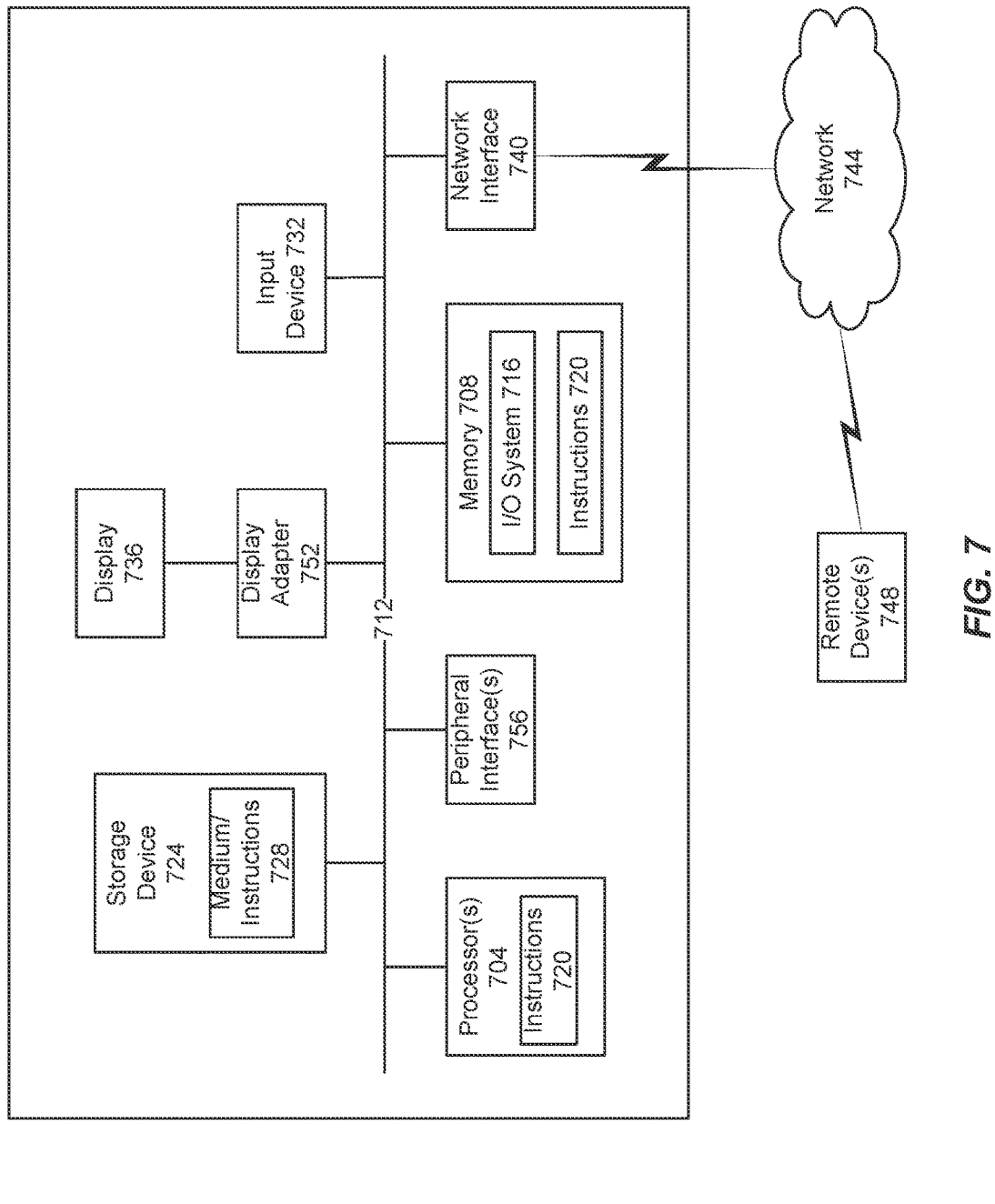
FIG. 7 shows an example embodiment of a computing system for implementing embodiments of the disclosure.

FIG. 7 shows an example embodiment of a computing system for implementing embodiments of the disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any amber of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may he connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof A network, such. as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid-state storage media and specifically excludes signals. It should be understood that the software can be installed in and sold with the device. Alternatively, the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives. magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular loans "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for establishing a trusted relationship implemented by a node in a distributed system, the method comprising:
    receiving, from a first neighboring node, a first data packet comprising a service, content of the service, and first service-related information, wherein the first service-related information comprises a first hash of the content and a service identifier (ID) of a service;
    computing a second hash of the content of the service;
    comparing the second hash to the first hash;
    verifying the first data packet when the second hash matches the first hash;
    accumulating, in response to the first data packet being verified, an amount of the content of the service received in the first data packet with other content of the service in other data packets received from the first neighboring node having the service ID to generate an accumulated amount of content;
    computing a third hash of the accumulated amount of content of the service;
    generating a first signature based on code stored in a trusted execution environment (TEE) of the node; and
    sending, to a second neighboring node, a second data packet comprising the service, the content of the service, and second service-related information, wherein the second service-related information comprises the service ID, the second hash, and the first signature.

2. The method of claim 1, further comprising sending, to the first neighboring node, an acknowledgement packet comprising the service ID, the third hash, and a second signature.

3. The method of claim 1, further comprising:
    creating a hash tree including a node structure having one or more leaf nodes, one or more child nodes, and one or more parent nodes, wherein each leaf node represents a hash of a content in a data packet received from a neighboring node and each parent node represents an accumulated hash of the content of each direct leaf node or each child node.

4. The method of claim 3, wherein the accumulated hash is calculated by:
incrementing the accumulated amount of content of the service based on the service ID;
adding the second hash as a leaf node in the hash tree, and updating corresponding parent nodes until a root node; and
removing the one or more child nodes of each parent node when there is no empty leaf node in its children nodes.

5. The method of claim 3, wherein the hash tree is divided into a plurality of hash subtrees, where each hash subtree represents a parent node and its corresponding one or more leaf nodes or one or more child nodes, and the data packet corresponding to each hash subtree is received from the neighboring node along a plurality of different paths.

6. The method of claim 5, further comprising merging, at the node, each of the hash subtrees corresponding to received data packets along the plurality of different paths.

7. The method of claim 6, further comprising determining whether a fourth hash of the received data packets is missing from the accumulated hash.

8. The method of claim 7, further comprising:
sending, after completion of receipt of data packets having the service ID, a third data packet comprising the accumulated amount of content of the service, an accumulated hash of the data packets and a node signature to a validation node.

9. The method of claim 7, wherein determining whether the fourth hash of the received data packets is missing from the accumulated hash comprises:
storing the accumulated hash for each transmission path with the service ID;
receiving an acknowledgment packet from the second neighboring node in response to sending the second data packet to the second neighboring node;
extracting a second accumulated hash from the acknowledgement packet; and
comparing the second accumulated hash with the stored accumulated hash.

10. The method of claim 1, further comprising verifying a second signature, signed by the first neighboring node, in the first data packet using a public key of a key pair.

11. A node for establishing a trusted relationship in a distributed system, the node comprising:
a memory storage comprising instructions; and
a processor in communication with the memory storage, wherein execution of the instructions by the processor causes the node to:
receive, from a first neighboring node, a first data packet comprising a service, content of the service, and first service-related information, wherein the first service-related information comprises a first hash of the content and a service identifier (ID) of a service;
compute a second first hash of the content of the service;
compare the second hash to the first hash;
verify the first data packet when the second hash matches the first hash;
accumulate, in response to the first data packet being verified, an amount of the content of the service received in the first data packet with other content of the service in other data packets received from the first neighboring node having the service ID to generate an accumulated amount of content;
compute a third hash of the accumulated amount of content of the service;
generate a first signature based on code stored in a trusted execution environment (TEE) of the node; and
send, to a second neighboring node, a second data packet comprising the service, the content of the service, and second service-related information, wherein the second service-related information comprises the service ID, the second hash, and the first signature.

12. The node of claim 11, wherein execution of the instructions by the processor further causes the node to send, to the first neighboring node, an acknowledgement packet comprising the service ID, the third hash, and a second signature.

13. The node of claim 12, wherein execution of the instructions by the processor further causes the node to create a hash tree, the hash tree includes a node structure including one or more leaf nodes, one or more child nodes and one or more parent nodes, wherein each leaf node represents a hash of a content in a data packet received from a neighboring node and each parent node represents an accumulated hash of the content of each direct leaf node or each child node.

14. The node of claim 13, wherein the accumulated hash is calculated by:
incrementing the accumulated amount of content of the service based on the service ID;
adding the second hash as a leaf node in the hash tree, and updating corresponding parent nodes until a root node; and
removing the one or more child nodes of each parent node when there is no empty leaf node in its children nodes.

15. The node of claim 14, wherein the hash tree is divided into a plurality of hash subtrees, where each hash subtree represents a parent node and its corresponding one or more leaf nodes or one or more child nodes, and the data packet corresponding to each hash subtree is received from the neighboring node along a plurality of different paths.

16. The node of claim 15, wherein execution of the instructions by the processor further causes the node to merge, at the node, each of the hash subtrees corresponding to received data packets along the plurality of different paths.

17. The node of claim 16, wherein execution of the instructions by the processor further causes the node to determine whether a fourth hash of the received data packets is missing from the accumulated hash.

18. The node of claim 17, wherein execution of the instructions by the processor further causes the node to:
store the accumulated hash for each transmission path with the service ID;
receive an acknowledgment packet from the second neighboring node in response to sending the second data packet to the second neighboring node;
extract a second accumulated hash from the acknowledgement packet;
compare the second accumulated hash with the stored accumulated hash; and
determine that the fourth hash of the received data packets is missing from the accumulated hash when the second accumulated hash does not match the stored accumulated hash.

19. The node of claim 11, wherein execution of the instructions by the processor further causes the node to verify a second signature, signed by the first neighboring node, in the first data packet using a public key of a key pair.

20. A non-transitory computer-readable medium storing computer instructions for establishing a trusted relationship in a distributed system, the computer instructions when executed by a processor of a node, cause the node to:

receive, from a first neighboring node, a first data packet comprising a service, content of the service, and first service-related information, wherein the first service-related information comprises a first hash of the content and a service identifier (ID) of a service;

compute a second hash of content of the service;

compare the second hash to the first hash;

verify the first data packet when the second hash matches the first hash;

accumulate, in response to the first data packet being verified, an amount of the content of the service received in the first data packet with other content of the service in other data packets received from the first neighboring node having the service ID to obtain an accumulated amount of content;

compute a third hash of the accumulated amount of content of the service;

generate a first signature based on code stored in a trusted execution environment (TEE) of the node; and send, to a second neighboring node, a second data packet comprising the service, the content of the service, and second service-related information, wherein the second service-related information comprises the service ID, the second hash, and the first signature.

\* \* \* \* \*